March 26, 1940.  D. A. WALLACE  2,195,059
BRAKE SHOE LAPPING APPARATUS
Filed Oct. 25, 1937  3 Sheets-Sheet 1

INVENTOR
David A. Wallace.
BY Hansen, Lind, Paler & Harris
ATTORNEYS.

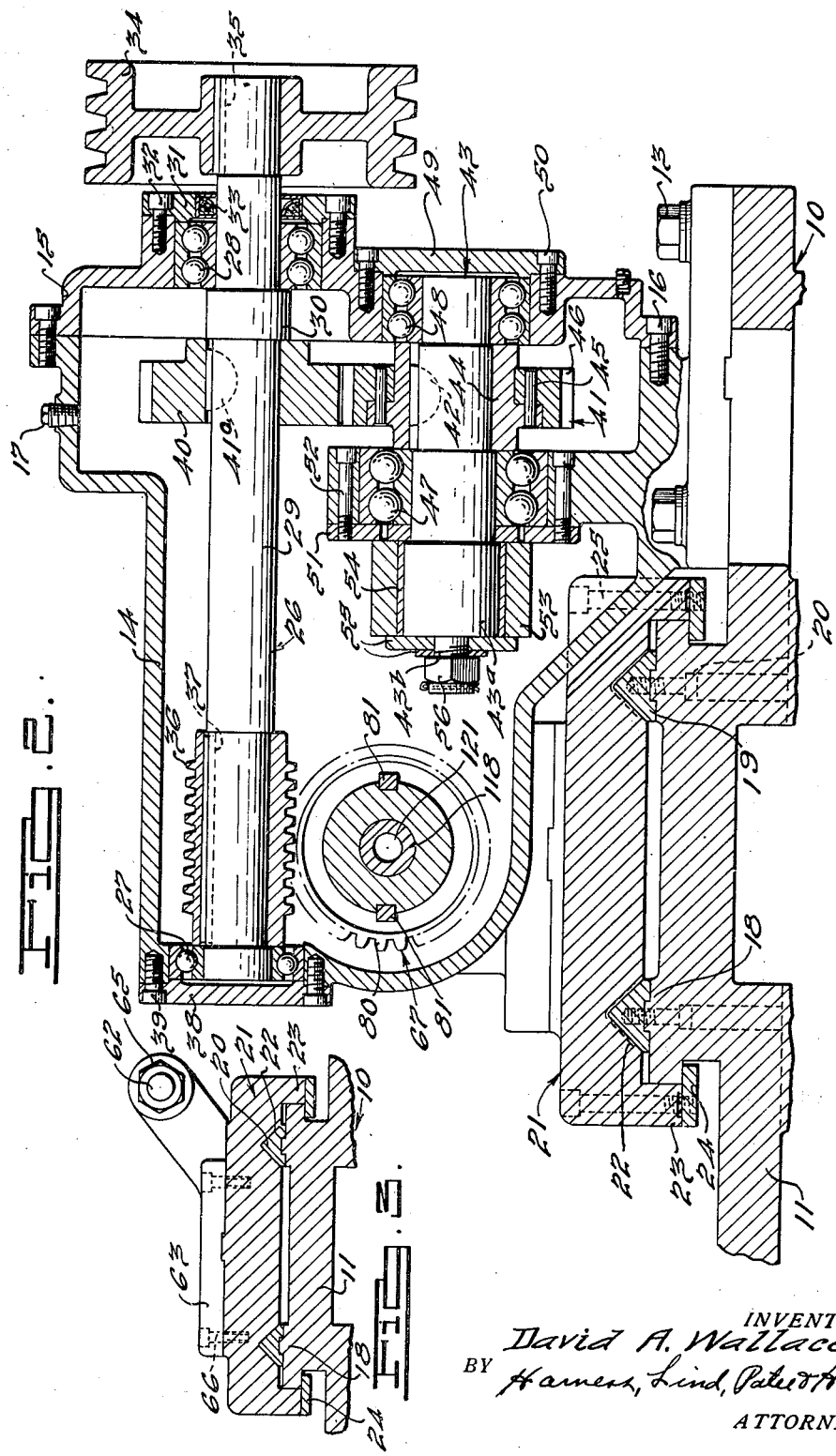

March 26, 1940.  D. A. WALLACE  2,195,059
BRAKE SHOE LAPPING APPARATUS
Filed Oct. 25, 1937  3 Sheets-Sheet 3

INVENTOR
David A. Wallace.
BY Harness, Lind, Pates & Harris.
ATTORNEYS.

Patented Mar. 26, 1940

2,195,059

UNITED STATES PATENT OFFICE 2,195,059

BRAKE SHOE LAPPING APPARATUS

David A. Wallace, Detroit, Mich., assignor to Chrysler Corporation, Highland Park, Mich., a corporation of Delaware Application October 25, 1937, Serial No. 170,748

15 Claims. (Cl. 51—157)

This invention relates to improved brake shoe lapping apparatus and method.

More particularly, the invention pertains to the provision of an improved apparatus for lapping the brake shoes of a hydraulic, mechanical or similar brake unit, preferably of the character used for motor vehicles, rotating members, and the like.

It is an object of the invention to provide an improved brake shoe lapping machine by which the brake unit, without its drum member, is moved bodily relative to the lapping tool during the lapping operation on a brake shoe.

Another object of the invention resides in the provision of an improved brake shoe lapping machine of this character which rotates and reciprocates the brake unit, without its drum member, during the lapping operation on a brake shoe, so as to permit close tolerances on the brake shoes and drum assembly.

A further object of the invention is to provide in an apparatus of this kind a means for yieldably urging each of the brake shoes, while the brake unit is simultaneously rotated and reciprocated axially about an axis corresponding to the rotative axis of the drum portion of a brake unit at a rate substantially of a vibratory order, while being urged toward the lapping tool with a uniform and predetermined force.

Another object of the invention is to provide an apparatus of this character which admits fluid pressure, preferably air pressure, to a normal wheel pressure cylinder of a hydraulic brake unit to urge each of the brake shoes, while the brake unit is simultaneously rotated and reciprocated axially at a rate of substantially vibratory order, and toward the lapping tool with a uniform and predetermined force.

Still another object of the invention resides in the provision of an improved method for bringing the braking surfaces of brake shoes of a fluid pressure actuated brake unit, having a pressure cylinder for normally actuating the brake shoes thereof, to true cylindrical contour which comprises rotatably and shiftably mounting the brake unit directly on the driving member of the lapping apparatus for reciprocatory movement in a course substantially parallel to its axis, admitting a predetermined fluid pressure to this pressure cylinder for moving the brake shoes into and out of lapping receiving relationship with a lapping tool at a predetermined lapping pressure, and drivingly rotating and reciprocating the brake unit.

Other objects and advantages of the invention will be more apparent from the following description taken in connection with the accompanying drawings, in which Fig. 1 is a horizontal sectional view of a brake shoe lapping apparatus embodying the invention.

Fig. 2 is an enlarged vertical sectional view taken as indicated by the line 2—2 of Fig. 1.

Fig. 3 is a detail partial sectional view taken approximately as indicated by the line 3—3 of Fig. 1.

Figure 1:
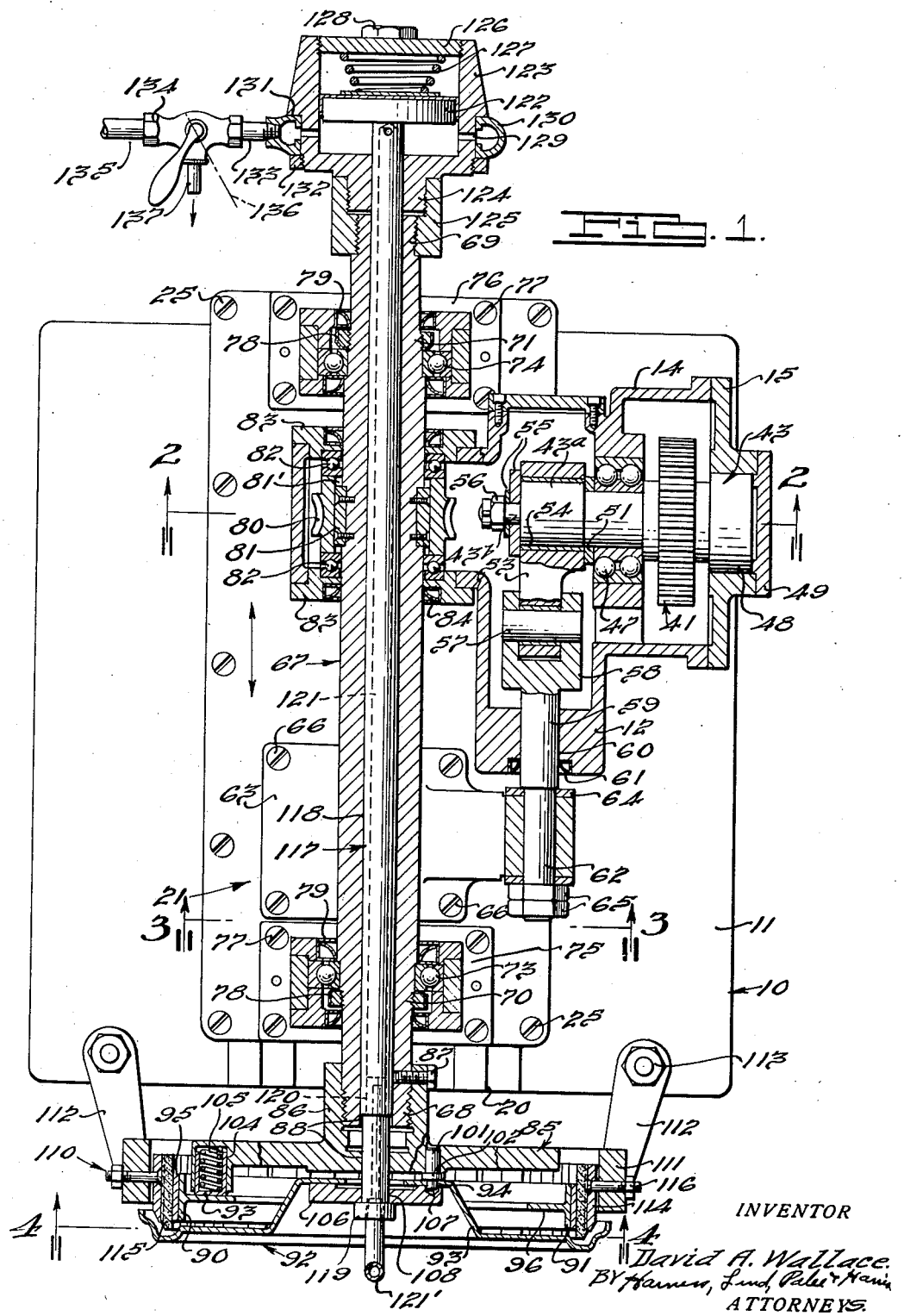

In the form of the invention illustrated in the drawings, the improved lapping apparatus comprises a stationary machine bed, generally indicated by the numeral 10, having lower and upper members 11 and 12 respectively which are secured together by bolts 13. The upper member 12 comprises casing and cover members 14 and 15 respectively which are detachably held together by bolts 16, a removable threaded plug 17 being received by the upper portion of the casing member 14 for the admittance of lubricant into the upper member 12. Formed on the bed lower member 11 are parallel guide extensions 18 which have horizontal guide rails 19 detachably secured thereto by screws 20.

The guide rails 19 support a shiftable carriage 21 having cooperating guide members 22 formed thereon and having guide extensions 23 which register with the side faces of the guide extensions 18. A pair of plate members 24 are detachably secured by screws 25 to the lower faces of the carriage guide extensions 18 to shiftably secure the carriage 14 to the lower member 11 of the machine bed.

Reciprocatory motion is imparted to the carriage 21 by a transversely extending drive shaft 26 which is journaled by bearings 27 and 28 mounted on the casing member 14. The shaft 26 comprises reduced and enlarged portions 29 and 30 respectively, the bearing 28 forming a stop for the reduced portion 29. This reduced portion 29 protrudes through a bearing retaining end member 31 secured to the cover member 15 by bolts 32, a fluid sealing member 33 being interposed between the member 31 and the shaft 26. The portion of the shaft 26 disposed outside the cover member 15 has a pulley 34 keyed thereon at 35, the pulley receiving its driving rotation from a suitable power source (not shown). The other extremity of the shaft 26 transmits a drive to a worm 36 which is keyed at 37 thereto, the gear 36 being adapted to rotate the work as will presently be more apparent. A bearing retaining end member 38 is secured to the outside of the casing member 14 by bolts 39 to retain the bearing 27 and to seal the upper member 11 of the machine bed. Disposed between the pulley 34 and the gear 36 on the shaft 26 is a gear 40 which is drivingly connected to the shaft 26 by a key 41a and which abuts against the enlarged portion 30 of the shaft.

The gear 40 is in constant mesh with a gear 41 which is keyed at 42 on a shaft 43 having an eccentric portion 43a and a threaded reduced portion 43b, the shaft being located below and parallel with the shaft 26. As shown, this gear 41 comprises a hub portion 44 which has fixed thereto by fasteners 45 a ring gear portion 46. A rotatable support is provided for the shaft 43 on either side of the gear 41 by bearings 47 and 48 which center the gear 41. The bearings 47 and 48 are mounted on the casing members 14 and 15 respectively. On the outer face of the member 15 a bearing retaining end plate 49 is secured thereto by bolts 50 for retaining the bearing 48 and sealing the upper member 11 of the machine bed 10. A bearing retaining end member 51 is fixed to the casing member 14 by bolts 52 for retaining the bearing 47 and for providing a stop for preventing the shaft eccentric portion 43a from moving to the right as viewed in Fig. 2. An eccentric crank arm 53 is journaled on a bearing 54 carried by the eccentric portion 43a, washers 55 and fasteners 56 being carried by the shaft reduced portion 43b to prevent movement of the arm 53 and the bearing 54 to the left as viewed in Fig. 2. The other extremity of the arm 53 is pivotally attached by a pin 57 to a bifurcated end portion 58 of a link member 59 slidably supported at 60 in the casing member 14, a shaft seal 61 being mounted on the member 14 to seal the casing.

The other extremity of the link member 59 has a reduced portion 62 which extends outside the casing member 12 and receives thereon a connecting member 63 which is centered on the portion 62 by a washer 64 and threaded fasteners 65. The connecting member 63 is detachably secured to the upper face of the carriage 21 (best shown in Fig. 3) by screws 66.

The reciprocatory movement of the carriage 21 is imparted to a rotatable tubular work carrying shaft, generally designated by the numeral 67, which is carried by the carriage 21 and reciprocates in a course substantially parallel to its axis. The tubular shaft 67 has reduced threaded end portions 68 and 69, and threaded portions 70 and 71. Journaled supports are provided for the shaft 67 by bearings 73 and 74 carried by bearing supports 75 and 76 respectively fixed by screws 77 to the upper surface of the carriage 21. A pair of locking rings 78 are secured to the threaded portions 70 and 71 of the shaft 67 and register with the bearings 73 and 74 to prevent relative reciprocatory movement of the shaft 67 and the carriage 21, a pair of seals 79 being disposed on either side of each of the pairs of rings 78 and bearings 73 and 74.

Rotation is imparted to the shaft 67 by the driving pulley 34 through the medium of the shaft 26, the worm 36, and a rotatable worm gear 80 which is keyed at 81 to the shaft 67. A pair of thrust bearings 82 are disposed around the shaft 67 at the end faces of the worm gear 80, the bearings 82 being supported by casing end members 83 of the upper member 12 which mount sealing members 84. The casing end members 83 containing the bearings 82 constitute a part of the fixed structure 12 with respect to which the rotatable shaft 67 is axially slidable, the keys 81 being carried by the shaft 67 and engaged in key ways 81' in the worm gear which are of greater length than the keys so as to accommodate reciprocatory movement of the shaft 67.

Figure 4:
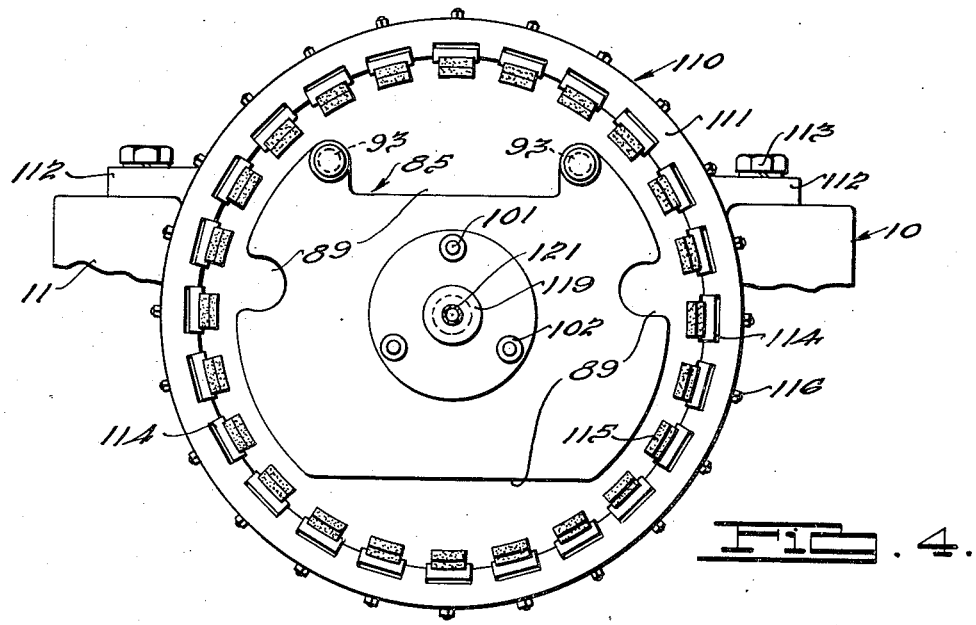
Fig. 4 is an end elevational view of the lapping apparatus taken along the line 4—4 of Fig. 1 but showing the brake unit to be lapped removed.
Figure 5:
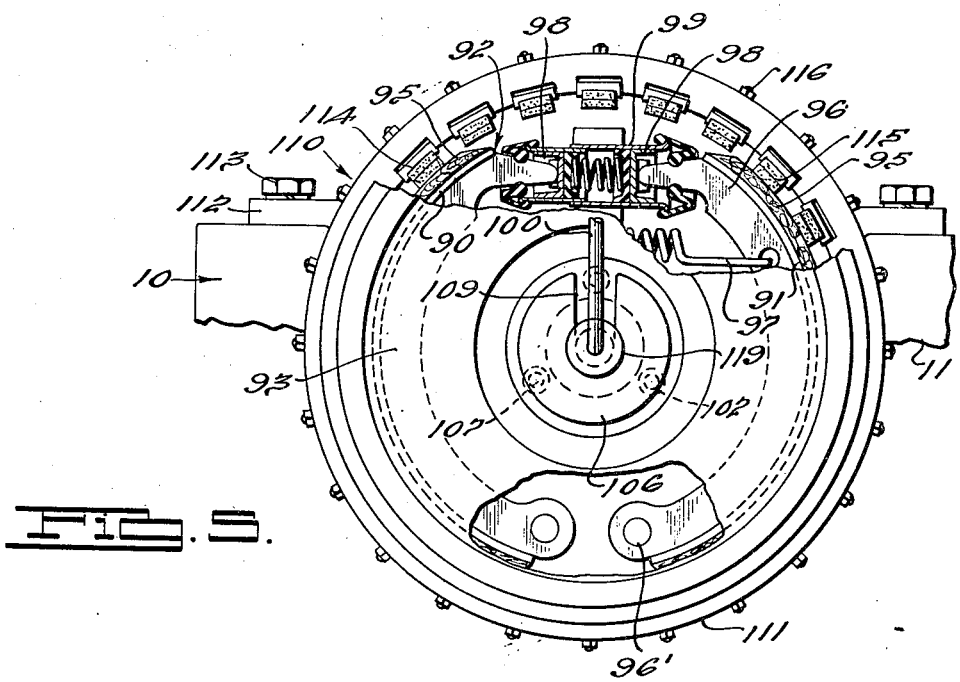
Fig. 5 is a view corresponding to Fig. 4 but showing the brake unit to be lapped in position to receive a lapping operation, a portion of the structure being broken away to show the details thereof.

A substantially circular work supporting fixture generally indicated by the numeral 85 is reciprocated and rotated by the shaft 67, the fixture 85 having a threaded hub portion 86 secured by a bolt 87 to the threaded end portion 68 of the shaft 67. The member 85 (best shown in Figs. 1 and 4) further comprises a centrally located aperture 88 which is aligned with the inner surface of the tubular shaft 67, and is cut away at 89 to accommodate certain protruding parts of the work.

The work shown in this particular embodiment of the invention comprises a pair of brake shoes, which have outer peripheral working surfaces to be lapped, adapted to operate in a fluid pressure controlled brake unit; however, brake shoes of other types of brake units may be lapped without departing from the scope of the invention. As illustrated, the work comprises a pair of pivotally mounted brake shoes 90 and 91 which are completely assembled within the brake unit, generally indicated by the numeral 92 in the same manner and in which they are ultimately to be employed on a vehicle or in another installation. It is desirable to feed the complete brake unit to the lapping machine so that the brake shoes can be correctly and conveniently lapped without the chance for error presented by mounting the brake shoes on a permanent fixture of the lapping apparatus and then assembling them to the rest of the brake unit assembly. This desirable lapping method preferably uses the surfaces and apertures normally employed in the brake unit to also mount the brake unit on the extension member 85 of the shaft 67 for lapping receiving relationship with a lapping tool.

The brake unit 92 comprises a plate backing member 93 which operably supports the pair of brake shoes 90 and 91, and which normally has a plurality of circumferentially spaced apertures 94 for mounting this brake unit on an axle or other structure. The brake shoes have suitable friction linings 95 to be lapped, and have web portions 96 and they are yieldingly urged inwardly about their respective pivots 96' by a spring 97. Pistons 98 acting within a cylinder 99 in response to fluid pressure supplied through an inlet conduit 100 urge the brake shoes outwardly about their pivots in a manner well known to those familiar with the art. The cylinder 99 and piston 98 also constitute a part of the assembled brake unit and are carried by the backing plate 93.

When the brake unit 92 is mounted on the illustrated brake shoe lapping apparatus each of the spaced apertures 94 of the member 93 is positioned and spaced from the member 85 by driving and pilot pins 101 fixed to the member 85, the pilot pins 101 each having a flange portion 102 of larger diameter than the aperture 94 which is disposed between the central portions of the plates 85 and 93. The pivoted portion of each of the brake shoes 90 and 91 is accommodated by the cavity 89 of the member 85, and to further support the brake shoes during the lapping operation a pair of slidable members 103 are carried by recesses 104 formed in the member 85 and yieldingly urged by springs 105 against the web portions 96 of the brake shoes. A C collar 106 is adapted to detachably secure the brake unit to the fixture 85 under the action of control mechanism, as will hereinafter be more apparent. The collar 106 is provided with a plurality of recesses 107 which register with and receive the outer ends of the pilot and drive pins 101, a centrally located aperture 108 which registers with the aperture 88 of the member 85, and a slot 109 to permit removal of the collar 106.

A lapping tool generally designated by the numeral 110, has an annular support ring 111 which has extensions 112 secured by bolts 113 to the bed member 11. The ring 111 supports preferably a plurality of circumferentially spaced lapping element support blocks 114 having lapping elements 115 therein adapted for lapping engagement with the brake shoes 90 and 91, the blocks 113 being detachably secured to the ring 100 by fasteners 116.

A tubular piston rod 117 is slidably supported within the shaft 67 and is adapted to releasably support the work 92 in its illustrated position. The piston rod 117 comprises a main body portion 118 and a flanged portion 119 which are threadably secured together at 120. The main body portion 119 extends through the apertures 88 and 108 and has its flanged locking portion outside the C collar 106. A passage 121 extends through the piston rod 117 and is connected with the inlet conduit 100 of the brake unit 92 by a tube 121'.

The other extremity of the piston rod 117 is fixed to a piston 122 which moves within a cylinder 123 in response to fluid pressure, the passage 121 being in communication with the cylinder 123 to admit fluid pressure into the cylinder 99 of the wheel brake unit 92 to cause the brake shoes 90 and 91 to urge their linings 95 toward the lapping elements 115. The cylinder 123 comprises a tubular threaded portion 124 which receives therein the rod 118 and is in threaded engagement with a nipple 125 which is secured to the threaded end portion 69 of the shaft 67 so as to impart rotative and reciprocatory movement from the shaft 67 to the cylinder 123. The cylinder 123 further comprises a threaded end cap 126 between which and the piston 122 a yielding means such as a spring 127 is interposed to yieldingly urge the holding flange 119 to its disengaged position, a nut head portion 128 being formed on the cap 126 to permit convenient assembling of the cap to the cylinder 123.

It is desired to admit fluid pressure, preferably air pressure, to the cylinder 123 to control the condition of the holding flange 119 and the pressure with which the brake shoes are urged into lapping engagement with the lapping elements, even while the cylinder 123 is rotating and reciprocating. A plurality of aligned circumferentially spaced apertures 129 are formed in the cylinder 123, and a hollow ring member 130 is positioned in leak-proof engagement around the cylinder 123 and in communication with the apertures 129. The ring 130 is disposed between a flange 131 formed on the cylinder and a threaded lock ring 132 carried by the cylinder.

Fluid pressure is admitted to the ring member 130 through a conduit 133 which receives the fluid pressure through a two-way valve 134 which communicates with a supply conduit 135 from a suitable source (not shown). When the valve control is at its illustrated position of Fig. 1 the fluid pressure is admitted to the cylinder 123 preferably under a predetermined pressure so that the holding flange 117 will be in its illustrated operative condition and so that the brake shoes will be urged with a predetermined pressure toward the lapping elements. With the valve control at the position indicated by the numeral 136 the communication between the conduits 133 and 135 is disrupted and the fluid pressure within the cylinder 123 and the conduit 121 is exhausted through an exhaust conduit 137 when the piston 122 is moved by the spring 127.

In the operation of this embodiment when it is desired to remove work from the shaft 67 the prime mover for the pulley 34 is shut off and fluid pressure, preferably air pressure, is exhausted from the cylinder 123 and the conduit 121 to the relief conduit 137 to permit the spring 127 to force the piston 122 downwardly and thereby to move the work holder 119 away from its illustrated position. The exhausting of the fluid pressure from the conduit 121 permits the spring 97 of the brake unit to retract the brake shoes from their lapping engagement with the lapping element 115. When the work holder 119 is in its disengaged position the C collar 106 may be removed entirely from the rod 117 by means of the slot 109 and the brake unit 92, after disconnecting the conduit 100 and tube 121', may be lifted off the holder 119 without receiving any surface marks from the lapping or the work clamping mechanisms. When the work holder 119 is in its disengaged condition the work is not held against the surfaces of the lapping elements 115, and the lapping elements may be removed if desired for any reason.

Following the unloading of the brake unit after the completion of the lapping operation on the brake shoes 90 and 91, another brake unit having brake shoes to be lapped is slipped over the work holder 119 onto the spacing guides 101 and the member 106 is then positioned relative to the rod 117 by means of the slot 109. The tube 121' is then placed in communication with the conduit 100 of the brake unit, and the valve 134 is closed manually to cut off exhausting of fluid pressure from the cylinder 123 and the conduit 121 so as to urge the member 119 into clamping engagement with the work clamping member 106.

The fluid pressure admitted to the cylinder 123 and the conduit 121 is preferably at a predetermined pressure so that the pistons 98 of the brake unit will urge the brake shoes into lapping engagement with the lapping elements 115 at a predetermined lapping pressure. The prime mover is then started to rotate the pulley 34 to simultaneously rotate the work carrying shaft 67 and to oscillate the carriage 21 and shaft 67 in short strokes through the eccentric 43ª.

By virtue of the foregoing lapping apparatus and method substantially the entire brake assembly with shoes, as normally used, can be mounted on the lapping apparatus to bring the friction surfaces of the shoes to true curvilinear conformity with the surface of the drum on which they operate when used on a vehicle or other device.

Various modifications and changes may be effected in the illustrated application without departing from the spirit of the invention or from the scope of the appended claims.

What I claim is:

1. Apparatus for lapping the brake shoe of a substantially assembled brake unit having its normal support and having a brake shoe operatively movably mounted thereon including a machine bed structure, means thereon adapted to coact with said support for rotatively and shiftably supporting said brake unit, a lapping tool adjacent said shoe, means for simultaneously rotating and reciprocating said brake unit bodily relative to said tool for lapping said brake shoe, and means for urging said shoe relative to said support and against said lapping tool.

2. Apparatus for lapping the brake shoe of a substantially assembled brake unit having its normal support and having a brake shoe normally operatively mounted thereon and having brake shoe applying parts including a machine bed structure, means including a driving member thereon for rotatively supporting said brake unit, a lapping tool supported on said bed, and means on said driving member securable to said support for mounting and centering said brake unit directly on said driving member, means for rotating said brake unit bodily relative to said tool, and means for actuating said brake shoe applying parts to apply said shoe to said lapping tool.

3. Apparatus for lapping the brake shoe of a substantially assembled brake unit having a normally operable brake shoe and mechanism for applying the latter including a machine bed structure, means thereon for rotatively supporting said brake unit, a lapping tool adjacent said shoe, said means and said tool being relatively movable for producing relative abrading movements between said tool and said unit and means for actuating said brake shoe applying mechanism to bring said brake shoe and said tool into and out of lapping engagement with each other during said relative movement of said brake unit and said tool.

4. Apparatus for lapping the brake shoe of a substantially assembled fluid pressure actuated brake unit having a pressure cylinder for normally applying said shoe including a machine bed structure, means thereon for supporting said brake unit, a lapping tool adjacent said shoe, said brake shoe and said tool being adapted to move into and out of lapping engagement with each other, and means for simultaneously releasably clamping said brake unit to receive said lapping engagement and urging said brake shoe and said tool into and out of lapping engagement with each other.

5. The method of lapping and bringing the brake surface of the brake shoe of a substantially completely assembled brake unit to true curvilinear conformity with the drum surface with which it coacts in normal operation which comprises relatively reciprocably and rotatively mounting a lapping element having lapping surface portions corresponding to said normal drum surface and a completely assembled brake unit including its brake shoe applying parts, drivingly producing relative reciprocation and rotation of said unit and said lapping element surface portions, and urging said brake shoe against said lapping element surface portions by actuation of the normal brake shoe applying parts of said brake unit during said relative reciprocation and rotation.

6. Apparatus for lapping the brake shoe of a substantially assembled fluid pressure actuated brake unit having a pressure cylinder for normally applying said shoe including a machine bed structure, means thereon for rotatively supporting said brake unit, a lapping tool adjacent said brake shoe, and means for admitting a predetermined fluid pressure to said pressure cylinder so as to bring said brake shoe and said tool into lapping engagement at a predetermined lapping pressure.

7. Apparatus for lapping the brake shoe of a substantially assembled fluid pressure actuated brake unit having a pressure cylinder for normally applying said shoe including a machine bed structure, means including a driving member thereon for rotatively supporting said brake unit, a lapping tool adjacent said brake shoe, means for mounting and centering said brake unit directly on said driving member, and means for simultaneously rotating and reciprocating said brake unit bodily relative to said tool and admitting a predetermined fluid pressure to said cylinder.

8. Apparatus for lapping the brake shoe of a substantially assembled fluid pressure actuated brake unit having a pressure cylinder for normally applying said shoe including a machine bed structure, a carriage shiftably mounted on said bed, means on said carriage and said bed for drivingly rotating and reciprocating said brake unit about an axis substantially parallel to the direction of shifting movement of said carriage, a tool fixture mounted on said support including a lapping element engageable with said brake shoe, means for moving said brake shoe and said tool into and out of lapping engagement with each other at a predetermined lapping pressure, and means for imparting said rotative and said reciprocatory movement to said brake unit while admitting a predetermined fluid pressure to said pressure cylinder.

9. Apparatus for lapping the brake shoe of a substantially assembled fluid pressure actuated brake unit having a pressure cylinder for normally applying said shoe including a machine bed structure, a work support rotatably supported by said carriage, a driving member carried by said support and adapted to drivingly rotate said work support about an axis substantially parallel to the movement of said carriage, a rotatable eccentric carried by said support and adapted to reciprocate said work support during rotation at a speed of substantially vibratory order, a tool fixture mounted on said support including a lapping element engageable with said brake shoe, means for drivingly mounting and centering said brake unit directly on said work support, and means for admitting a predetermined fluid pressure to said pressure cylinder for bringing said brake shoe and said tool into lapping engagement with each other at a predetermined lapping pressure.

10. The method of lapping and bringing the brake surface of the brake shoe of a substantially completely assembled brake unit to true curvilinear conformity with the drum surface with which it coacts in normal operation which comprises relatively reciprocably and rotatively mounting a lapping element having lapping surface portions corresponding to said normal drum surface and a completely assembled brake unit including its brake shoe applying parts, drivingly producing relative movement between said unit and said lapping element surface portions, and urging said brake shoe and said lapping element surface portions into and out of lapping engagement with each other by actuation of the normal brake shoe applying parts of said brake unit during said relative movement.

11. The method of lapping and bringing the brake surface of the brake shoe of a substantially completely assembled brake unit to true curvilinear conformity with the drum surface with which it coacts in normal operation which comprises reciprocably and rotatably mounting a completely assembled brake unit including its brake shoe applying parts relative to a fixed lapping element having lapping surface portions corresponding to said normal drum surface, drivingly reciprocating and rotating said unit, and urging said brake shoe against said lapping element surface portions by actuation of the normal brake shoe applying parts of said brake unit during said relative reciprocation and rotation.

12. Apparatus for lapping the brake shoe of a substantially assembled brake unit having its normal support and its brake shoe normally operably mounted thereon including a base structure, means thereon detachably engageable with said support of said unit for supporting the latter with said shoe exposed to receive a lapping operation, a lapping tool adjacent said shoe, said means and said tool being relatively movable for producing relative lapping movement of said tool and said unit, and means for bringing said lapping tool and said brake shoe into and out of lapping engagement with each other by movement of said shoe relative to said support.

13. The method of lapping and bringing the brake surface of the brake shoe of a substantially completely assembled brake unit to true curvilinear conformity with the drum surface with which it coacts in normal operation which comprises relatively movably mounting a lapping element having lapping surface portions corresponding to said normal drum surface and a substantially completely assembled brake unit including brake shoe applying parts, drivingly producing relative lapping movement between said unit and said lapping element surface portions, and urging said brake shoe against said lapping element surface portions by actuation of said brake shoe applying parts of said brake unit during such relative movement.

14. Apparatus for lapping the brake shoe of a substantially assembled brake unit having brake shoe applying parts including means for supporting said unit with the friction surfaces of said shoe exposed for receiving a lapping operation, a lapping tool adjacent said shoe, said lapping tool and brake unit supporting means being relatively movable for accomodating relative lapping movement between said friction surface and said tool, means for drivingly producing relative lapping movement between said tool and said brake unit supporting means, and means for actuating said brake shoe applying parts during said relative lapping movement so as to bring said tool and brake shoe into engagement under lapping pressure.

15. Apparatus for lapping and bringing the friction surface of a brake shoe of a substantially assembled brake unit to true curvilinear conformity with the drum surface with which it coacts in normal operation including means for supporting said unit with the friction surface of said shoe exposed for receiving a lapping operation, a lapping tool adjacent said brake unit supporting means having lapping surface portions corresponding to said drum surface, said lapping tool and brake unit supporting means being relatively movable for accommodating relative lapping movement between said friction surface of said shoe and said lapping surface portions of said tool, and means for urging said friction surface of said shoe against said lapping surface portions of said tool during such relative lapping movement.

DAVID A. WALLACE.